Patented Mar. 15, 1938

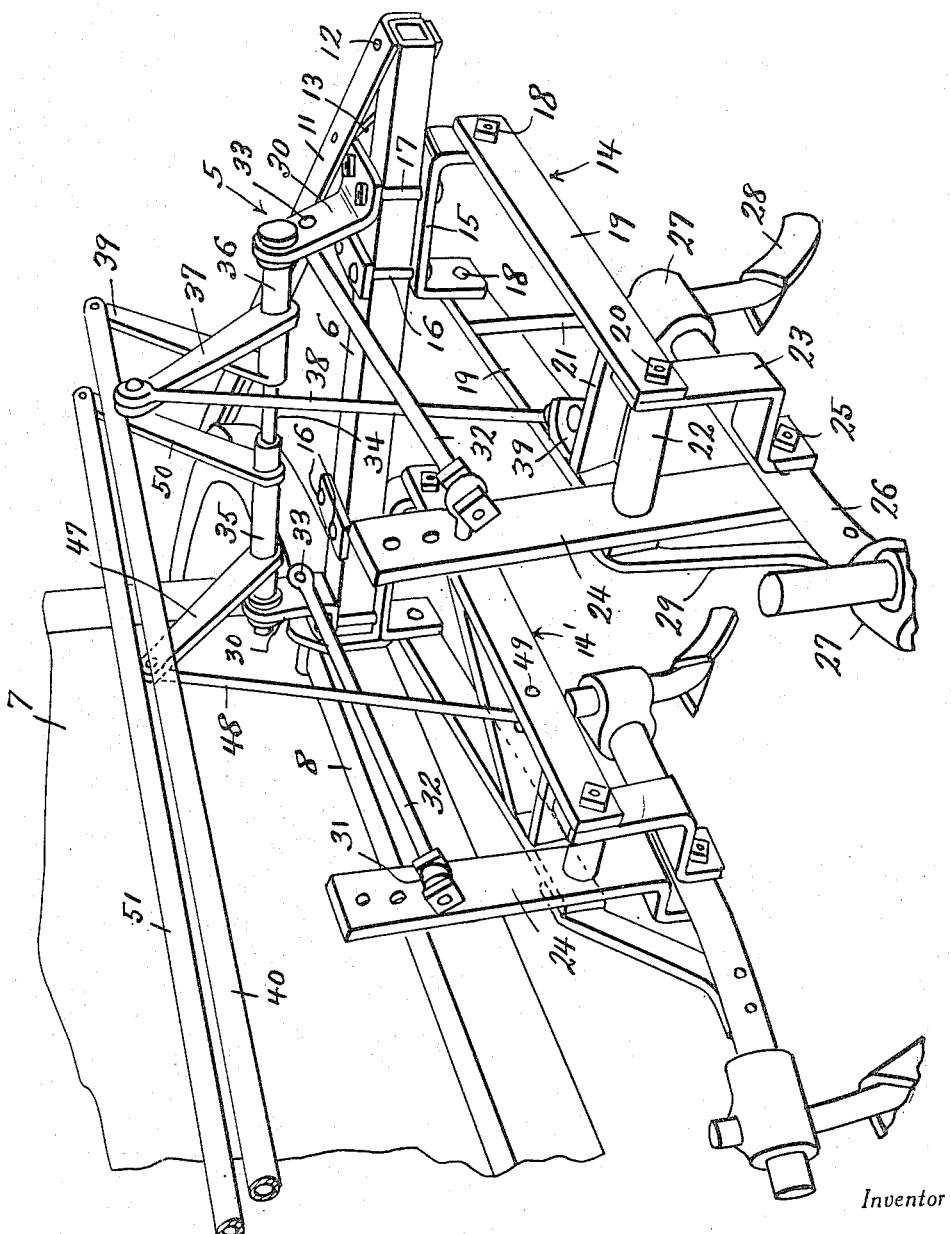

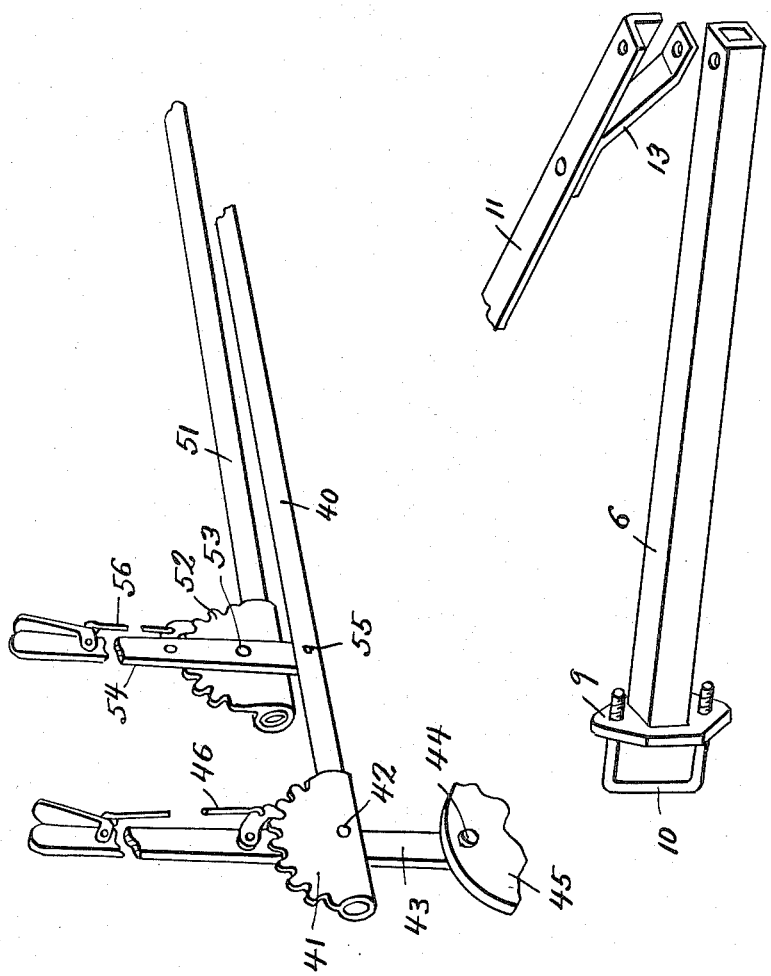

2,111,453

UNITED STATES PATENT OFFICE 2,111,453

CULTIVATOR ATTACHMENT FOR TRACTORS

Raymond Carl Lange, Odebolt, Iowa

Application June 22, 1937, Serial No. 149,735

1 Claim. (Cl. 97—47)

This invention relates to soil working tools, and more particularly to a cultivator attachment for tractors.

An object of the invention is to provide a cultivating implement of the character above mentioned, which may be readily detachably connected with a tractor and having improved means whereby the soil engaging units of the attachment are raised and lowered relative to the ground, as found desirable.

The invention, together with its objects and advantages, will be best understood from a study of the following description taken in connection with the accompanying drawings, wherein:

Figure 1 is a perspective view illustrating the application of the attachment to one side of a tractor at the forward end of the latter.

Figure 2 is a perspective view showing fragmentarily the raising and lowering rods and levers, and Figure 3 is a perspective view of an attaching bar and brace rod therefor, the mentioned parts being shown separated.

Referring to the drawings by reference numerals, it will be understood that in the preferred embodiment of the invention, there will be a cultivator attachment at each of the two sides of the tractor and that each attachment is disposed adjacent the forward or front end of the tractor.

In the drawings, the attachment is indicated generally by the reference numeral 5. In the preferred embodiment thereof, each attachment 5 comprises an attaching bar 6 in the nature of a tubular bar which is adapted to extend laterally from one side of the tractor, a portion of which is shown in the drawings and indicated generally by the reference numeral 7. The bar 6, at one end thereof, is detachably secured to the frame 8 of the tractor through the medium of an attaching plate 9 formed integrally with one end of the bar 6 and suitably apertured to accommodate a U-bolt 10, which straddles the frame of the tractor, as clearly shown in Figure 1.

The bar 6 is braced relative to the tractor through the medium of a diagonal brace bar 11, which at one end is suitably bolted or otherwise secured to the frame of the tractor at the forward end of the frame and at its other end is bolted or otherwise secured, as at 12, to the outer free end of the bar 6. For strength, the brace bar 11 is formed of angle iron and is itself braced relative to the bar 6 through the medium of a brace 13 formed of strap iron and riveted or otherwise secured at one end to the brace 11 and at its other end secured to the under side of the bar 6 through the medium of the aforementioned bolt 12.

Further, the attachment 5 includes a pair of rigs 14 and each rig 14 consists of an inverted U-shaped bracket 15 secured to the bar 6 through the medium of a pair of U-bolts 16 and 17, respectively. Pivoted to the downturned flanges of the bracket 15, as at 18, are side bars 19 which at their free ends are connected by a bolt 20. Further, and inwardly from the free ends thereof, the side bars 19 are secured in spaced relation through the medium of transverse and diagonal spacer bars 21.

Disposed on the bolt 20 is a spacer sleeve 22 and confined on the bolt 20 between one end of the sleeve 22 and a side bar 19 is the apertured end of a vertical substantially Z-shaped strap or plate 23. Also confined between one end of the spacer sleeve 22 and the other of the side bars 19 is the intermediate portion of an apertured hanger bracket or oblong plate 24 and securely bolted to the lower end of the hanger brackets 23 and 24, as at 25, is the intermediate portion of a tool carrying beam 26 on which, at the front and rear ends thereof, are clamped as at 27, the shanks of earth-working tools or cultivator shovels 28. Also, each tool carrying beam 26 is braced relative to a side bar 19 through the medium of a suitable brace member 29.

Secured to the top of the beam or bar 6 through the medium of the bolts 17, are brackets 30, and the hanger brackets 24 of the rigs 14 are provided at their upper ends with vertical rows of spaced apertures to accommodate eye-bolts 31, which accommodate the nut-equipped ends of suspension rods 32, which rods 32 at one end are pivoted to the brackets 30, as at 33.

For raising and lowering the rigs 14 to place the tools 28 into and out of ground engaging position, there is supported between the brackets 30 a rod 34 on which are rotatable tubular shafts 35 and 36, respectively. The tubular shaft 36 is provided with an arm 37 to which is pivotally connected one end of a connecting rod or link 38, the other end of which is suitably engaged with a plate 39 on the inner side of one of the side members 19 of rig 14. Also, the shaft 36 is provided with an arm 39 to which is pivoted one end of a push and pull rod 40. The rod 40 at its free end is provided with a rack segment 41 and at said end is also pivoted, as at 42, to a hand lever 43. The lever 43 is pivotally mounted, as at 44, on some suitable fixed part 45 of the tractor 7 and in proximity to the seat of the tractor, so that the lever 43 may be conveniently manipulated by the operator of the tractor.

The lever 43 is provided with a suitable detent 46 so that when the detent 46 engages with the rack segment 41, swinging movement of the lever 43 will be transmitted to the rod 40 for rotating the shaft 36. Rotation of the shaft 36 will be transmitted through the link 38 to the rig 14 for raising and lowering the earth working tools 28, the rig 14 swinging vertically on its pivot 18.

The shaft 35 is also provided with an arm 47 to which is pivotally connected one end of a link 48 which, at its free end, is connected to the rig 14, as at 49, and in a manner identical with the manner in which the aforementioned link 38 is connected with the rig 14'. Also, the shaft 35 is provided with an arm 50 to which is pivoted one end of a push and pull rod 51 which extends rearwardly and at its rear free end is provided with a rack segment 52 to which is pivoted, as at 53, a hand lever 54. The lever 54 in turn is pivoted, as at 55, to the push and pull rod 40 forwardly of the rack segment 41. The lever 54 is also equipped with a detent 56 cooperable with the rack segment 52.

It will thus be seen that by holding the lever 43 against pivotal movement and swinging the lever 54 about its pivot 55, the push and pull rod 51 will be manipulated for raising and lowering the rig 14' without affecting the position of the rig 14. It will also be apparent that with the detent 46 engaged with the rack segment 41 and with the detent 56 engaged with the rack segment 52, swinging movement of the lever 43 will be transmitted to the lever 54, so that the rods 40 and 51 will be simultaneously operated for raising and lowering, simultaneously, the rigs 14 and 14', at one side of the tractor.

Thus it will be seen that the rigs 14 and 14' may be operated simultaneously or separately and independently of one another, as found desirable.

It will be further appreciated that the manner in which the brackets 15 and 30 are clamped to the rod 6, the rigs 14 and 14' may be adjusted laterally relative to one another to position the rigs either close together or far apart, as the spacing of the rows of crops may require.

It is thought that a clear understanding of the construction, utility and advantages of the invention will be had without a more detailed description.

Having thus described the invention, what is claimed as new is:

In a cultivator attachment for tractors, a supporting bar provided at one end thereof with means for detachably securing said bar to a tractor frame to extend laterally from the tractor, a pair of brackets mounted on the supporting bar for longitudinal adjustment on said bar relative to one another, means for securing said brackets on said supporting bar at the desired position of adjustment, and each of said means including an upstanding bracket element, a tool-carrying rig pivoted at one end thereof to each of the first mentioned brackets, each of said rigs including an upstanding hanger bracket, suspension rods pivoted at one end to the aforementioned upstanding bracket elements, inter-engaging means on each of said suspension rods and each of said hanger brackets for detachably and adjustably connecting one end of each suspension rod to a hanger bracket, a rod supported fixedly between said bracket elements, tubular shafts rotatably supported on the last named rod, each of said tubular shafts being provided with a pair of arms disposed at different degrees relative to one another, a link connecting one arm of each pair of arms with one of said rigs, whereby to transmit rotative movement of a tubular shaft to a rig for raising and lowering the latter, and pushing and pulling mechanism connected with the second arm of each pair and operable for rotating the associated tubular shaft whereby said rigs may be vertically adjusted either simultaneously or independently of one another, optionally.

RAYMOND CARL LANGE.